US009581816B2

(12) United States Patent
Wengrovitz et al.

(10) Patent No.: US 9,581,816 B2
(45) Date of Patent: Feb. 28, 2017

(54) DIGITAL GLASS ENHANCED MEDIA SYSTEM

(71) Applicant: Mutualink, Inc., Wallingford, CT (US)

(72) Inventors: Michael S. Wengrovitz, Concord, MA (US); Joseph R. Mazzarella, Tolland, CT (US)

(73) Assignee: Mutualink, Inc., Wallingford, CT (US)

( * ) Notice: Subject to any disclaimer, the term of this patent is extended or adjusted under 35 U.S.C. 154(b) by 529 days.

(21) Appl. No.: 14/072,379

(22) Filed: Nov. 5, 2013

(65) Prior Publication Data
US 2015/0123876 A1 May 7, 2015

(51) Int. Cl.
G02B 27/01 (2006.01)
H04N 7/173 (2011.01)
H04N 21/414 (2011.01)
H04N 21/4223 (2011.01)
H04N 21/4788 (2011.01)
(Continued)

(52) U.S. Cl.
CPC .......... *G02B 27/017* (2013.01); *G06F 1/163* (2013.01); *H04N 7/173* (2013.01); *H04N 21/2396* (2013.01); *H04N 21/41407* (2013.01); *H04N 21/4223* (2013.01); *H04N 21/4788* (2013.01); *H04N 21/6125* (2013.01); *H04N 21/6175* (2013.01); *G02B 2027/0178* (2013.01)

(58) Field of Classification Search
CPC ............. H04N 7/173; H04N 21/41407; H04N 21/4223; H04N 21/4788; H04N 21/6125; H04N 21/6175; H04B 27/017; G06F 1/163
See application file for complete search history.

(56) References Cited

U.S. PATENT DOCUMENTS 7,494,216 B2 * 2/2009 Jannard ................. G02C 11/06
351/158
7,500,747 B2 * 3/2009 Howell ................. G02C 11/10
351/158
(Continued)

FOREIGN PATENT DOCUMENTS

WO WO2010/140907 A1 12/2010

OTHER PUBLICATIONS

Written Opinion of the International Searching Authority directed to related International Patent Application No. PCT/US2014/064048, mailed Mar. 31, 2015; 12 pages.
(Continued)

*Primary Examiner* — Alpus H Hsu
(74) *Attorney, Agent, or Firm* — Sterne, Kessler, Goldstein & Fox PLLC

(57) ABSTRACT

A digital glass enhanced media system (DGEMS) is provided that is capable of performing routing and processing of audio and video inputs received from a plurality of digital glass devices, as well as a plurality of agencies, in order to provide enhanced and coordinated information distribution among the digital glass devices. Such routing may include distributing information received from the devices to relevant agencies providing assistance to the wearers of those devices, as well as to other team member devices. Control is also provided, such that a user of such a digital glass device car select how or what information is received. In this manner, coordinated information distribution can be provided so as to allow users to optimize the coordination of their teamwork.

23 Claims, 10 Drawing Sheets

(51) Int. Cl.
*H04N 21/61* (2011.01)
*G06F 1/16* (2006.01)
*H04N 21/239* (2011.01)

(56) References Cited

U.S. PATENT DOCUMENTS

| | | | | |
|---|---|---|---|---|
| 7,760,898 | B2* | 7/2010 | Howell | G02C 5/001 |
| | | | | 381/322 |
| 7,806,525 | B2* | 10/2010 | Howell | G02C 11/10 |
| | | | | 351/158 |
| 8,306,625 | B2* | 11/2012 | Vyas | A61N 1/36046 |
| | | | | 607/139 |
| 8,758,021 | B2* | 6/2014 | Takahashi | G06Q 10/10 |
| | | | | 348/108 |
| 8,965,460 | B1* | 2/2015 | Rao | G06F 3/005 |
| | | | | 455/566 |
| 9,158,115 | B1* | 10/2015 | Worley | G02B 27/0172 |
| 2004/0057405 | A1 | 3/2004 | Black | |
| 2007/0064969 | A1* | 3/2007 | Chou | H04R 1/1066 |
| | | | | 381/381 |
| 2008/0205683 | A1* | 8/2008 | Weyer | H04R 1/1066 |
| | | | | 381/381 |
| 2012/0115494 | A1 | 5/2012 | Christensen et al. | |
| 2012/0263449 | A1* | 10/2012 | Bond | G03B 17/54 |
| | | | | 396/420 |
| 2013/0083173 | A1 | 4/2013 | Geisner et al. | |
| 2013/0127980 | A1 | 5/2013 | Haddick et al. | |
| 2013/0141313 | A1* | 6/2013 | Zhou | G02B 27/017 |
| | | | | 345/8 |
| 2013/0146659 | A1* | 6/2013 | Zhou | G06Q 20/355 |
| | | | | 235/380 |
| 2013/0148750 | A1 | 6/2013 | Kumhyr | |
| 2013/0162632 | A1 | 6/2013 | Varga et al. | |
| 2013/0172068 | A1* | 7/2013 | Zhou | G06Q 30/02 |
| | | | | 463/16 |
| 2013/0176626 | A1 | 7/2013 | Heinrich et al. | |
| 2013/0225290 | A1* | 8/2013 | Zhou | A63F 13/12 |
| | | | | 463/31 |
| 2013/0346168 | A1* | 12/2013 | Zhou | G06F 1/163 |
| | | | | 705/14.4 |
| 2014/0253694 | A1* | 9/2014 | Zustak | H04N 13/0018 |
| | | | | 348/51 |
| 2014/0266988 | A1* | 9/2014 | Fisher | G02B 27/017 |
| | | | | 345/8 |
| 2014/0268008 | A1* | 9/2014 | Howell | G02C 5/143 |
| | | | | 351/111 |
| 2014/0342660 | A1* | 11/2014 | Fullam | H04N 7/181 |
| | | | | 455/3.06 |
| 2014/0363059 | A1* | 12/2014 | Hurewitz | G06Q 30/0201 |
| | | | | 382/118 |

OTHER PUBLICATIONS

International Search Report to related International Patent Application No. PCT/US2014/064048, mailed Mar. 31, 2015; 6 pages.

* cited by examiner

DIGITAL GLASS ENHANCED MEDIA SYSTEM

BACKGROUND

Field

The disclosure relates to information distribution, and specifically to coordinating the distribution of information to and from digital eyeglass technology during one or more incidents.

Related Art

Recently, digital eyeglass technology has been developed that is capable of connecting to the Internet and providing its wearer with hands-free device-resident and cloud-based audio and video services. This allows for digital information to be superimposed on the wearer's frame of vision. As such, a wearer can view their immediate surroundings as well as digital information provided by way of the digital eyeglass display. One current implementation, Google Glass™, includes a heads-up display, a front-facing camera, a bone-conducting audio transducer, a microphone, and other sensors capable of detecting GPS location, geospatial orientation, and eye blinks, and can connect to IP-based services via WiFi, and can also tether via Bluetooth to legacy mobile phones, keyboards, and other personal area network devices. Other similar devices may include the same or similar functionality or may be logically coupled to include the same or similar functionality.

To date, this technology has been limited in its functionality and uses. Digital eyeglasses operate primarily as a simple internet-connected data sink. In other words, the digital eyeglasses are connected to the internet and operate as any other internet-capable device would operate. For example, based on some criteria (such as user input, for example), the digital eyeglasses receive information from the internet or a server. The digital eyeglasses then provide this information to the wearer, such as via the eyeglass digital display and/or earphone speakers.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
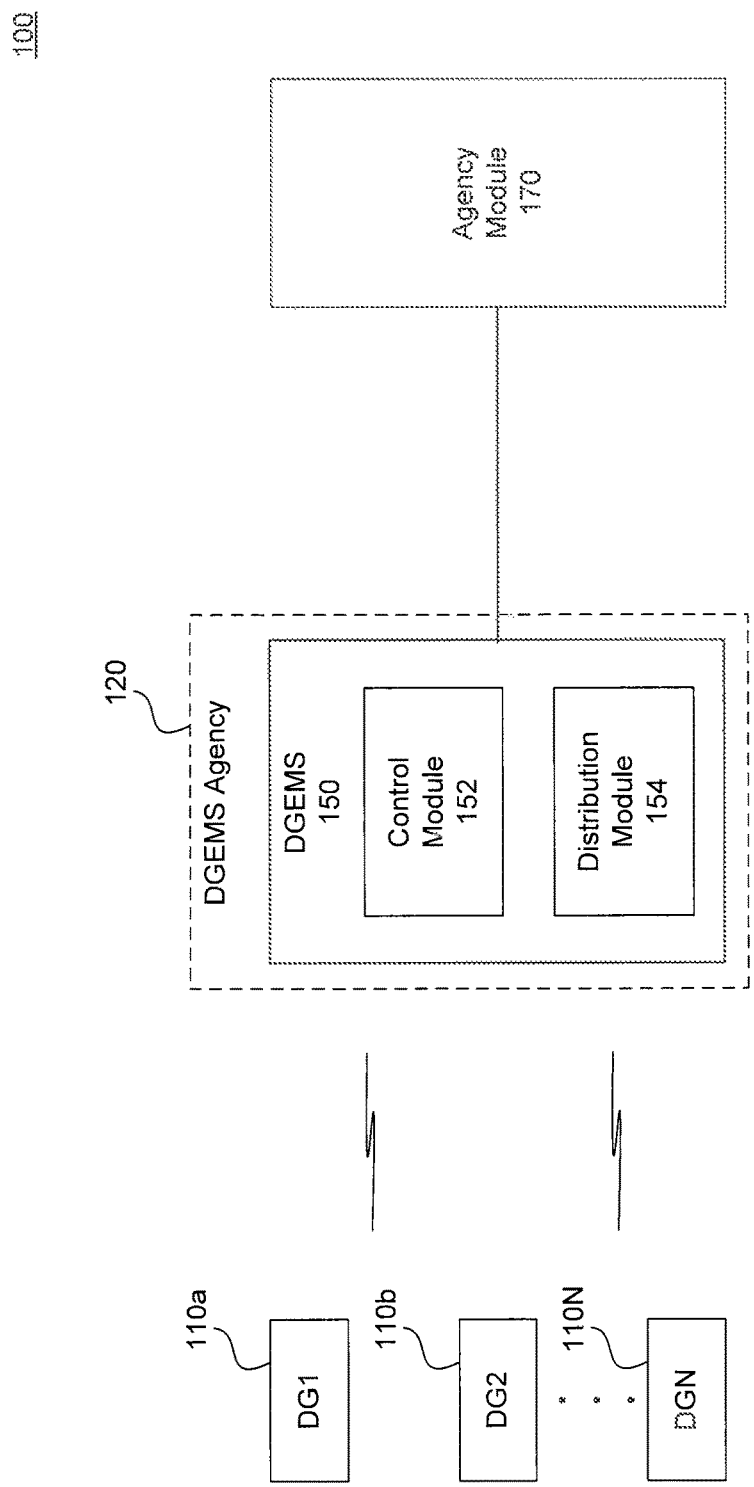
FIG. 1 illustrates an exemplary coordinated digital eyeglass environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to be limiting.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, processor, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many types of communication and digital eyeglass systems, and should not be limited to a digital glass environment.

An Exemplary Coordinated Digital Eyeglass Environment

FIG. 1 illustrates an exemplary coordinated digital eyeglass environment 100 according to an exemplary embodiment. In the environment 100, a plurality of digital glass devices DG1-DGN 110a-110N are in communication with a Digital Glass Enhanced Media System (DGEMS) 150. The DGEMS 150 is also connected to an agency module 170.

Each of the digital glass devices 110 may be in the form of wearable eyeglasses that include a digital video display and an audio output to provide the wearer with visual and audio information. Likewise, the digital glass devices may include a video input device, such as a video camera, and an audio input, such as a microphone. With these functional capabilities, the digital glass devices are capable of capturing audio and visual information for distribution to one or more other cooperating team members, including other digital glass wearers, a central command station, and cooperating agencies, among others. In addition, these functional capabilities allow the digital glass wearer to receive and be apprised of audio and visual information for use in carrying out a coordinated and/or team task.

The agency module 170 may include one or more cooperating agency's communication networks or lines, infrastructures, databases, etc. The agencies may be assisting with a particular task being carried out by the digital glass wearers, and may be utilized to analyze information received from the digital glass devices 110 and/or providing information to the digital glass devices.

In an embodiment, the DGEMS 150 is local to a particular agency (e.g., DGEMS Agency 120) and performs the media distribution and communication coordination among the various digital glass devices 110 and any cooperating external agencies included as part of the agency module 170. When local to a particular agency, that agency has autonomous control over the operation of the DGEMS, including the external agencies that are permitted to receive information from, and provide information to, the DGEMS 150, and hence the digital glass devices. This configuration allows an agency to have full control over the information that is released to outsiders. In another embodiment, the DGEMS 150 is centralized, and can be configured either on-site, or from one or more of the remote agencies. This configuration potentially shares cost among agencies and can provide on-site configurations to a person personally knowledgeable of any incidents that may be occurring.

The DGEMS 150 includes a control module 152 that identifies the sources and/or destinations of the data received from the digital glass devices 110 and/or the various agencies within the agency module 170. The distribution module 154 performs the actual distribution of the various data streams to their intended recipients, as determined by the control module 152. In other words, based on the control from the control module 152, the distribution module directs incoming data to its designated destinations. In an embodiment, the distribution module may also perform one or more processes on the data before directing the data to its destinations. The configurations and functionalities of the various components of the coordinated digital eyeglass environment 100 will be described in further detail below.

Digital Glass Enhanced Media System

Figure 2:
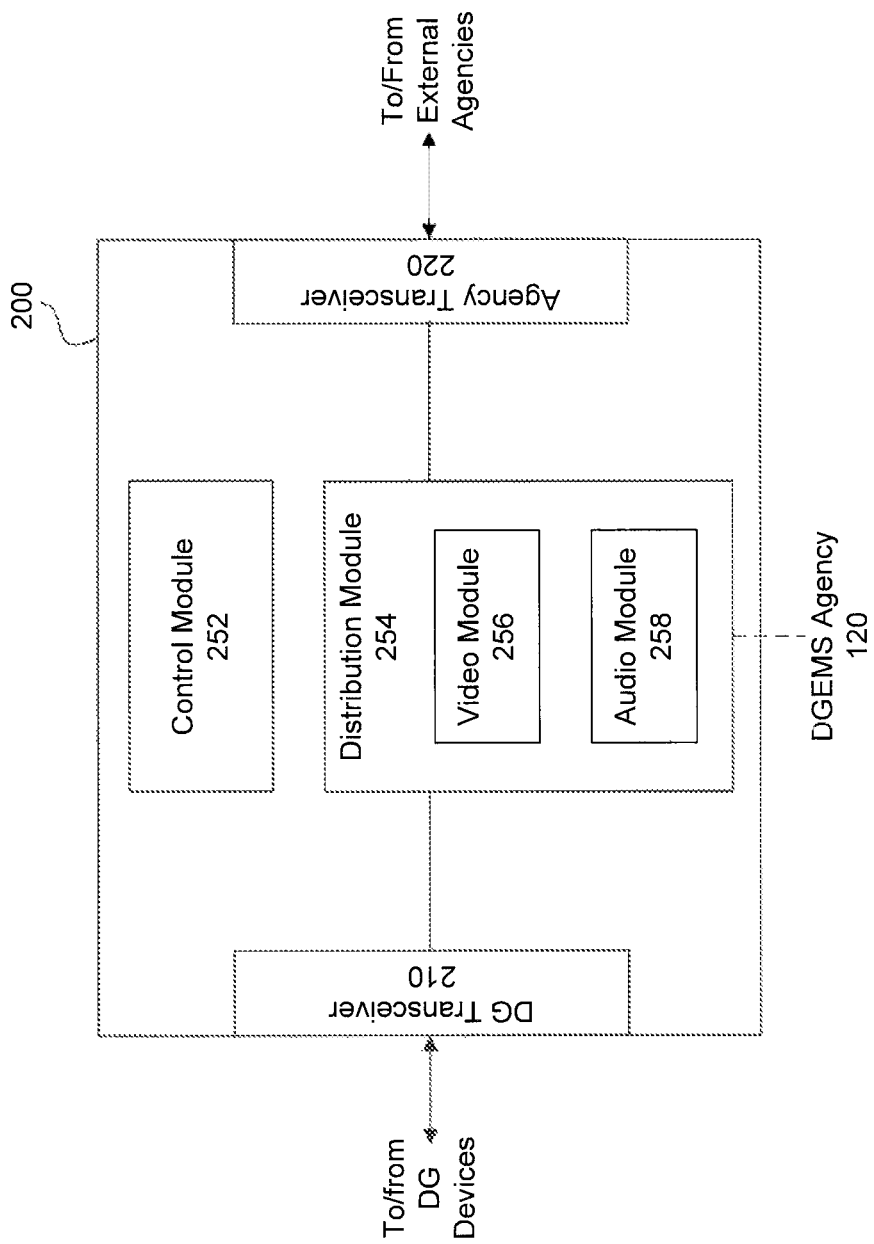
FIG. 2 illustrates an exemplary digital glass enhanced media system (DGEMS) included within the digital eyeglass environment.

FIG. 2 illustrates an exemplary digital glass enhanced media system (DGEMS) 200 included within the digital eyeglass environment 100. The DGEMS 200 includes a digital glass transceiver 210, an agency transceiver 220, a control module 252, and a distribution module 254, and may represent an exemplary embodiment of the DGEMS 150.

The digital glass transceiver 210 communicatively couples the DGEMS 200 to the various digital glass devices 110 in the field. The digital glass transceiver 210 is capable of wirelessly receiving digital communications from, and transmitting digital communications to, the digital glass devices 110. The digital glass transceiver 210 can communicate with the digital glass devices 110 using any known wireless communication scheme, such as wireless telecommunications protocols (e.g., LTE, 4G, 3G, etc.), or any other suitable communication protocol.

The agency transceiver 220 communicatively couples the DGEMS 200 to any number of cooperating external agencies. For purposes of this discussion, an agency can be any agency, department, office, or other group or person designated to receive information from the DGEMS 200 relating to one or more of the digital glass devices 110 and/or provide information to the DGEMS 200 relating to one or more of the digital glass devices 110. Such information may include audio and/or visual information received from one or more of the digital glass devices 110, audio and/or visual information generated by the agency for distribution to one or more of the digital glass devices 110, as well as control information for configuring the control module 252, among others. As discussed above, in an embodiment, the DGEMS 200 may be located locally at a particular agency. This DGEMS Agency has its own information link with the distribution module 254 so as to have access to all information processed by the DGEMS 200, as well as to be capable of providing information to the DGEMS 200.

Each of the digital glass transceiver 210 and the agency transceiver 220 may include wireless and/or wired communication capabilities. Each may wirelessly communication using one or more than one antenna. In an embodiment, the digital glass transceiver 210 and the agency transceiver 220 can be a single transceiver. Using the digital glass transceiver 210 and the agency transceiver 220, the DGEMS is capable of coordinating communication between the various cooperating agencies, the local DGEMS agency (if localized), and the digital glass devices 110 in the field. Specifically, the control module 252 and distribution module 254 operate to receive information by the digital glass transceiver 210 and the agency transceiver 220 on one or more data input streams, provide that information to the DGEMS agency, and distribute that information as necessary to relevant recipients, as discussed in further detail below.

Control Module

Figure 3:
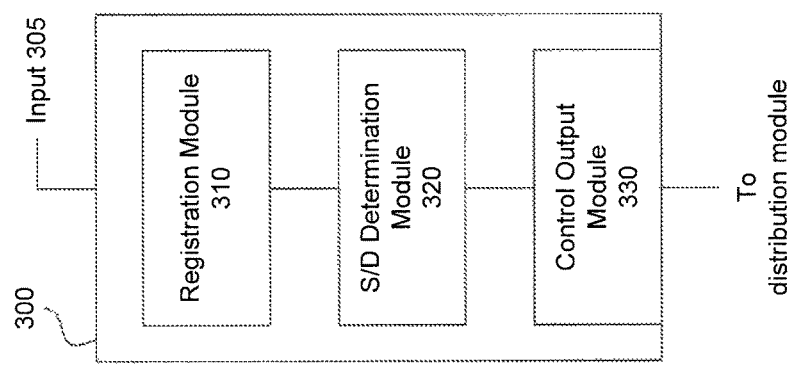
FIG. 3 illustrates an exemplary control module included within the DGEMS.

FIG. 3 illustrates an exemplary control module 300 included within the DGEMS 200. The control module 300 includes a registration module 310, a source/destination (SD) determination module 320, and a control output module 330, and may represent an exemplary embodiment of the control module 252 and/or control module 152.

The registration module 310 stores relational and routing information for one or more of the digital glass devices 110 connected to the DGEMS 100 as well as one or more of the cooperating agencies connected to the DGEMS 100 in order to assign where information should be sent/received.

For example, when digital glass device 110 is taken into the field, it can be registered with the registration module 310. As part of the registration process, the digital glass device 110 can be assigned a unique identifier. In an embodiment, the unique identifier can be an IP address or other communication identifier. The registration of the unique identifier may be entered manually by a user, scanned from a barcode, QR code, or RFID tag, etc. The unique identifier of the digital glass device can be registered in the registration module 310 in association with one or more parameters. Such parameters may include its Field Group (which can define other digital glass devices 110 that are in field as part of the same operation or incident), an Agency Group (to define the agencies that should be in communication with the device), a Leader flag (to identify whether the digital glass device 110 is assigned to the group leader), among other parameters that may be useful in determining how information should be routed.

TABLE 1

Digital Glass Device Registration Table

| Device ID | Field Group | Agency Group | Leader? |
|---|---|---|---|
| 000 | A | 1 | Y |
| 001 | A | 1 | N |
| 010 | B | 2 | Y |
| 100 | B | 2 | N |
| 101 | B | 3 | N |
| 110 | B | 3 | N |

Table 1, above, provides an exemplary registration table that may be maintained by the registration module 310. As shown, each digital glass device 110 is identified by its unique ID, and can be associated with various parameters, including Field Group, Agency Group, and a Leader flag. These parameters can be used by the control module 300 to accurately distribute information throughout the coordinated communication system using the SD determination module 320 and the control output module 330.

When localized with the DGEMS agency 120, the Agency Groups identify the external agencies that are authorized to use (send/receive) the DGEMS. The external agencies may be defined as part of an incident, or may be customized according to the DGEMS Agency 120. When localized, in an embodiment, only persons authorized by the DGEMS Agency 120 has permissions to add or remove external agencies and perform other registration configurations. When centralized, the Agency Group includes all agencies that are assisting with a particular incident, and can be assigned according to a local authorized user.

The SD (source/destination) determination module 320 is configured to determine the sources from which various input data streams are being received, as well as where those data streams should be transmitted. The SD determination module 320 can determine the source of a particular data stream in one or more of several different ways, including by extracting a source identifier from the data stream itself, such as from a packet or signal header. Based on the identified source, the SD determination module 320 determines the destination(s) designated for receiving the input data stream by referencing the registration information managed by the registration module 310. The SD determination module 320 may also be provided one or more distribution rules for each Field Group that defines the manner in which data is routed within that field group.

For example, in an embodiment involving Field Group A, the SD determination module may be provided with the following rules of information distribution: (1) display visual input information received from Device ID 000 to other members of the same Field Group; (2) display visual input information received from Device ID 001 to other members of the same Field Group; (3) provide audio and visual input information received from all Field Group devices to all Agency Group members; and (4) provide audio and visual input information received from Agency Group members to Leader.

In this scenario, as input data streams are received by the DGEMS 150, the SD determination module 320 identifies their respective sources and accesses the registration module and its own distribution rules to determine how those information streams should be distributed. For example, the SD determination module 320 determines that the source of a particular input video data stream is the device having Device ID 001. Based on its distribution rules, the SD determination module 320 determines that the video data stream should be routed to other members of the same Field Group (rule 2) as well as to all Agency Group members (rule 3). The SD determination module 320 then accesses the registration module 310, and determines that the other members of the same Field Group includes Device ID 000 and that the Agency Group members includes all members of Agency Group 1 (the actual listing of Agency Group members may be stored in a separate table).

From its determinations, the SD determination module 320 indicates to the control output module 330 that the video data stream received from the Device ID 001 should be routed to the Device ID 000 and the various members of Agency Group 1. The control output module 330 then performs the actual control of the distribution module 254 to implement the information distribution.

The control module 300 is also depicted in FIG. 3 with a general input 305. Although under general use, this input 305 may include the data streams or the relevant information to determine the source information of those data streams, the input 305 can also provide control functionality to one or more users, including agency personnel, a local user, or a wearer of a registered digital glass device 110. For example, after the initial registration, circumstances may arise in which the predefined rules need to be broken or redefined, or registered relationship data needs to be reconfigured. In these circumstances, the input 305 may function as a conduit for allowing a user to override or adjust the predefined registration information and/or rules.

For example, after the digital glass devices 110 have been registered and are in the field, an original member of Field Group B (e.g., Device ID 010) may shift roles such that it should now be registered with Field Group A. In that scenario, the leader of Field Group A (Device ID 000) may have control authority to adjust the previous registration, Such adjustments may be made via voice or other input commands, which the control module 300 receives via the input 305. The control module 300 then modifies the rules and the registration table as instructed (and may provide defaults where no specific instructions are provided).

In an embodiment, the SD determination module 320 performs distribution determinations for all received data streams. By defining distribution rules for each field group in the SD determination 320, by registering each of the digital glass devices 110 in the registration module 310, and by providing on-the-fly reconfiguration of those rules and registration information, the control module 300 is capable of providing an extremely efficient, customized, and effective distribution of data throughout the coordinated communication environment 100.

Distribution Module

Figure 4:
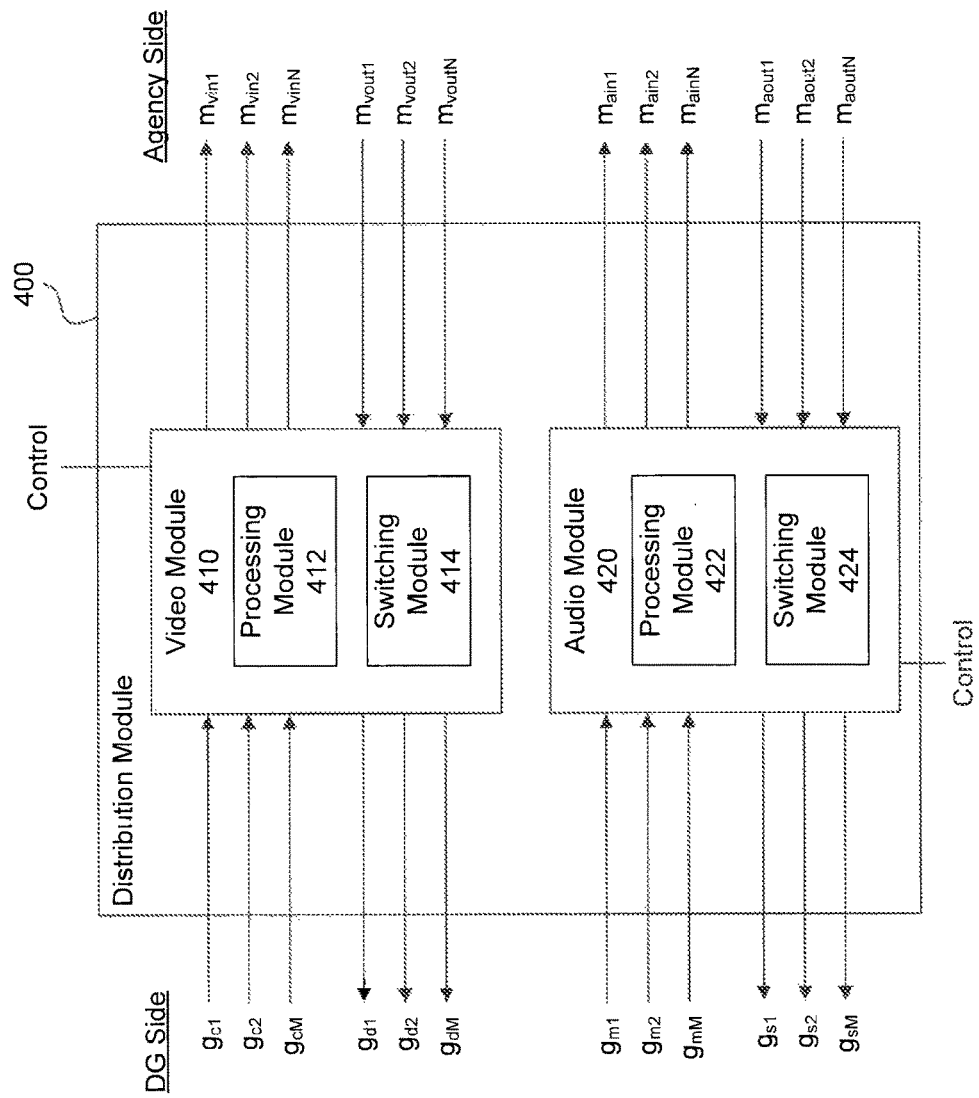
FIG. 4 illustrates an exemplary distribution module included within the DGEMS.

FIG. 4 illustrates an exemplary distribution module 400 included within the DGEMS 200. The distribution module 400 includes a video module 410 and an audio module 420, and may represent an exemplary embodiment of the distribution module 254.

Switching

The video module 410 includes a processing module 412 and a switching module 414, and provides switching and processing of video information. The video module is capable of receiving up to M video streams ($g_{c1}$-$g_{cM}$) output from M digital glass devices 110 in the field (such as via their cameras), as well as N video streams ($m_{vout1}$-$m_{voutN}$) output from one or more external sources (such as agencies). Similarly, the video module 410 is capable of providing up to M video streams ($g_{d1}$-$g_{dN}$) to M digital glass devices 110 in the field (such as to their displays), as well as N video streams ($m_{vin1}$-$m_{vinN}$) input to one or more external sinks (such as agencies). In an embodiment, the video data is transmitted as a real-time RTP-based video media with standard compression, such as H264 and MPEG, among others.

In an embodiment, the video module 410 selects and cross-connects the various video streams based on the control information provided from the control module 300. Specifically, the switching module 414 forwards the input video streams $g_c$ received from the digital glass devices 110 to the corresponding agencies identified in the registration module 310, as dictated by the control information received from the control module 300. For example, in an IP scenario, when a particular input stream is designated to be forwarded to more than one agency, the processing module 412 may duplicate the incoming packets and modify the destination IP addresses and ports of each copied packet. The copies of the video packets are then routed to the corresponding plurality of agencies by the switching module 414 based on their respective destination IP addresses and ports. In this manner, the video module 410 operates as a controllable and logical M×N switch, thereby minimizing CPU requirements. Likewise, input video streams received from the one or more agencies can be processed and routed to the designated digital glass devices in substantially the same manner.

In another embodiment, the processing module 412 takes a more active role in preparing video for distribution. For example, the processing module 412 may change the resolution or picture size of the video designated for the digital glass devices 110 (due, for example, to lower resolution). The processing module 412 may perform additional video processing as needed. In some circumstances, the processing module 412 may perform video combining processing. In particular, the video module 410 may receive several video streams from the one or more agencies. And in certain circumstances, it may be desired to provide a plurality of those video streams to one or more of the digital glass devices 110 simultaneously, whether the video streams are tiled, superimposed, or otherwise combined. In this situation, the processing module 410 is configured to perform the desired video combining processing, and to provide the resulting video signal to the switching module 414 for forwarding to the designated digital glass devices 110. Other video signal processing enhancements are also possible—highlighting certain regions of the video, spot-shadowing, motion compensation, filtering, etc.

The audio module 420 functions similarly to the video module 410 with respect to audio signals. For example, the audio module 420 is capable of receiving up to M audio streams ($g_{m1}$-$g_{mM}$) from the digital glass devices 110 (such as via their microphones), and up to N audio streams ($m_{aout1}$-$m_{aoutN}$) output from one or more external sources (such as agencies). Similarly, the audio module 420 is capable of providing up to M audio streams ($g_{s1}$-$g_{sM}$) to the digital glass devices 110 (such as to their speakers), and up to N audio streams ($m_{ain1}$-$m_{ainN}$) input to the one or more external sinks (such as agencies). The switching module 424 performs the routing of the audio streams to various destinations based on the control information received from the control module 300, and the processing module 422 performs any necessary processing on the audio information as needed, including filtering, combining, background noise removal, speech enhancement, etc. In an embodiment, the audio data is transmitted as a real-time RTP-based voice media with standard compression, such as G711 and/or G726, among others.

For ease of understanding, the routing configurations of the video module 410 and the audio module 420 can be demonstrated using matrix notations. For purposes of this discussion, and simplicity of explanation, only the routing of the video module 410 will be demonstrated.

To start, assume that the digital glass devices 110 and their respective video displays are represented by a vector:)

$$\vec{g}_d = (g_{d1} g_{d2} g_{d3} g_{d4})^T \quad (1)$$

and that the various video inputs received from the one or more agencies are represented by a vector:

$$\vec{m}_{vout} = (m_{vout1} m_{vout2} m_{vout3})^T \quad (2)$$

and a 4×3 matrix $MG_v$ represents the cross-connects applied to the digital glass devices 110:

$$MG_v = \begin{bmatrix} 1 & 0 & 0 \\ 1 & 0 & 0 \\ 0 & 0 & 1 \\ 0 & 1 & 0 \end{bmatrix} \quad (3)$$

In this representation, a 1 in the $ij^{th}$ position denotes routing an IP packet from the $j^{th}$ agency output video (input to the DGEMS) to the $i^{th}$ digital glass device 110 video display. As a result:

$$\vec{g}_d = MG_v \vec{m}_{vout} \quad (4)$$

This representation similarly applies to the audio streams being routed from the agencies to the digital glass devices 110, as well as to the audio and video streams being routed from the digital glass devices 110 to the agencies. For example, in a scenario where a matrix $GG_v$ represents the routing of video inputs received from the digital glass devices 110 to other digital glass devices 110, matrix $MM_v$ represents the routing of video inputs received from the agencies to other agencies, matrix $GM_v$ represents the routing of video outputs from the digital glass devices 110 to the agencies, and matrix $MG_v$ represents the routing of video outputs from the agencies to the digital glass devices, the overall DGEMS video simultaneous switching can be represented in a combined partitioned matrix representation as:

$$(\vec{g}_d \vec{m}_{vin})^T = \begin{pmatrix} MG_v & GG_v \\ MM_v & GM_v \end{pmatrix} (\vec{m}_{vout} \vec{g}_c)^T \quad (5)$$

In equation (5), $g_c$ represents the vector of video input streams from the digital glass devices 110 (such as via a camera). A similar representation can be made for the audio switching performed by the distribution module 400.

Processing

As discussed above, the processing module 414 within the video module 410 may, in some circumstances, need to combine multiple video streams into a single stream. This can be performed in several ways, such as by tiling the multiple streams into a single stream, or by cycling through the multiple streams in the single stream.

In an embodiment, the multiple streams are combined by cycling through the streams in a single video stream to a particular digital glass device 110. In this circumstance, to provide an example, a first digital glass device 110a view may be displayed for a predetermined period, followed by a second digital glass device 110b view may being displayed for the predetermined period, and so on.

This cycling may depend on a large number and variety of factors or rules, such as the location (based on GPS, indoor location-based system, radio triangulation, etc.), movement of one or more digital glass devices 110, video analytics applied to video streams, manual selection by an agency and/or wearer of the digital glass device 110, among others.

To provide an example, the tiling or dynamic cycling of a particular digital glass device 110 display may depend on whether a responder's location is inside or outside of a particular location. In this example, when another responder enters the interior of the location, the tiles mosaic of the digital glass device automatically updates to include the mosaic of previously-present responders together with the newly-arrived responder.

As previously discussed, these unique video streams can be provided by the processing module 412 within the video module 410. As previously discussed, the processing module 412 may also perform general video processing on the video streams being transmitted to the digital glass devices 110. Such processing may include adjusting contrast or brightness, zooming in or out, motion compensation, background removal, moving or stationary object enhancement or annotation, and the like. This processing may be done automatically based on one or more factors, or as directed by an agency, a wearer of the digital glass device, or a local user.

Further, although conventional digital glass devices provide only a single display over a single eye, the distribution module 400 can also be configured to provide multiple video streams to each digital glass device in the event that such devices are configured to support dual video displays (e.g., one for the right eye, and one for the left eye). In this scenario, the DGEMS 200 may send two video streams to each digital glass device 110. These different video streams can include entirely different information, or related information, such as component pairs of a stereoscopic image.

Similarly, although conventional digital glass devices provide only a single camera, the distribution module 400 can also be configured to receive multiple video streams from each digital glass device in the event that they are equipped with multiple cameras. Such cameras could optimally be positioned near each eye for providing a stereoscopic display, and/or on the front and back of the device to provide surveillance of the wearer's blind side.

System Configurations

In an embodiment, the distribution module 400 is capable of performing the switching and the processing substantially simultaneously. However, in some embodiments, it may be beneficial to have one DGEMS for performing the routing and a second DGEMS for performing the processing in order to reduce the processing load on each DGEMS. Alternatively, one DGEMS can perform video switching and processing, whereas another DGEMS performs the audio switching and processing.

Within the digital glass device, there may be a single application that performs the stream startup and media conversion for both video and audio, such as a audio/video SIP client that sets up bidirectional flows. Alternatively, the digital glass device may contain a plurality of clients acting together in order to setup and render media flows, such as a SIP client for two-way audio, an RTSP server for transmitting video, and an RTSP client for receiving video. Many other audio and video transfer configurations may be available.

In an embodiment, the configurations of the digital glass device 110 and the DGEMS 200 would be such that connectivity of the streams would be persistently maintained and re-established, even when media is not actually flowing. This is particularly useful in situations where connectivity can be easily interrupted. In this manner, the digital glass device 110 need not manually answer a SIP INVITE from the DGEMS 200, nor manually initiate a SIP INVITE to the DGEMS 200.

In an embodiment, the DGEMS 200 designates predetermined ports for each of receiving video from the digital glass devices 110, providing video to the digital glass devices 110, receiving audio from the digital glass devices 110, and providing audio to the digital glass devices 110. The DGEMS 200 may also designate different predetermined ports for routing information between the DGEMS 200 and the agencies.

In an embodiment, the system 100 performs auto-discovery and plug-and-play for new devices. For example, when a digital glass device 110 is powered on in the field, that digital glass devices automatically establishes a connection with the DGEMS 200 and registers therewith. Similarly, when an incident is identified, one or more agencies can automatically be notified and a connection can be automatically established between those agencies and the DGEMS 200.

Control

As previously discussed, the control module 300 may receive control inputs from a variety of sources. Further these control inputs may have a variety of purposes, such as adjusting the routing of information within the distribution module 400, providing the selection and cycling between various data streams, and adjusting the processing to be performed on the various data streams, etc.

In an embodiment, the control module 300 may include several pre-registered routing and/or cycling configurations, which may be stored in the registration module 310, for example. A control input can then be provided by a user to select one of the pre-registered configurations dynamically. For example, when the leader desires a tile configuration, he can provide a control input (audio or manual input) to select the desired configuration. Internal timers in the control output module 330 cause various control signals to be output to the distribution module for selecting between various data streams.

In addition to the internal times, the control module 300 may also contain simple or complex business logic and processing rules that cause various impacts to the switching and processing of the various streams. Under different conditions, the controls might only support more rudimentary operations, and the timers, rules and business logic might be implemented by an external program issuing commands to the distribution module 400.

In an embodiment, the control module 300 authenticates the control inputs for adjusting the system. For example, the control module 300 makes a determination as to whether control inputs that will affect a Field Group A digital glass devices are received from a user authorized to affect the information provided to Field Group A. Likewise, the control module 300 makes a determination as to whether control inputs that will affect Agency Group 1 are received from a user authorized to affect the information provided to Agency Group 1. As a default, authorized users may be limited to a DGEMS Agency 120 administrator (when localized), or to members of the group being affected (when centralized).

It should be understood that control inputs are not limited to "users," but can also be provided from authorized programs or other automated devices. In addition, the input 305 of the control module 300 can receive non-control input, such as time of day, device locations, sensor measurements, etc. Using this input data, the control module 300 can perform its own dynamic control based on one or more rules programmed therein, which may or may not be unique to a particular Field Group and/or Agency Group. For example, using device location information received from different digital glass devices 110, the control module 300 may determine that a first device and a second device have moved close to one another. From this determination, the control module 300 may issue control commands to the distribution module to provide a notification to each of the devices, as well as to automatically provide their video streams to the other.

In an embodiment, the control module 300 may receive control inputs from a wearer of a particular digital glass device 110, and may control the distribution module 400 to change the displayed video information provided to that digital glass device accordingly. For example, the user swiping a touch panel of the digital glass device 110 may cause the video stream to switch from a first input video to a second input video. Likewise, a tap of the touchscreen may cause a zooming action of the currently-displayed video. Other controls, such as pausing, stopping, shifting, among others, may have corresponding control actions performable by a wearer of the device.

In an embodiment, any suitable user interface may be used to provide the wearer of the digital glass device with control functionality. In addition, the digital glass device may be capable of issuing certain control instructions automatically upon the detection of a particular event. Such an event may be detected using one or more sensors included in the digital glass device. For example, a bio sensor on the digital glass device may monitor the vitals of its wearer. When the information detected by the bio sensor is indicative of an emergency condition of the wearer, the video and/or audio information supplied to the digital glass device may automatically change (such as displaying a video message or playing an audio message requesting confirmation as to whether medical assistance is needed), and/or emergency personnel can be notified.

Many different events can be detected through the use of various sensors, and the audio/video information supplied to the wearers can be adjusted automatically based on the sensed information. In an embodiment, event notifications are generated by the digital glass devices and transmitted to the control module 300 via the input. In another embodiment, the raw sensed data is transmitted to the input of the control module 300 for analysis, and the control module 300 analyzes the sensed information to detect events.

Context-Specific Virtual Multimedia Artifacts

In an embodiment, utilizing the above-described system and configurations, users of the digital glass devices, and or members of the agencies, can create or modify context-specific information for distribution to other digital glass device wearers and/or other computing devices. Such information may be stored either in the DGEMS 200 or at a remote location.

The digitally-stored information is context-specific due to its relevance to the particular location of the wearers, its creation by one of the field wearers, its relevance to a particular event, and/or other factors. In an embodiment, the DGEMS 200 may determine, based on the locations of the wearers, that a map of a mall or a local area may be desired. The DGEMS retrieves that information from the digital storage and offers it to the wearers. Likewise, a digital glass wearer, may capture a photograph of a point of interest (e.g., such as a particular strategic position), and annotate the photograph with a notation (audio or written) such as, for example, "potential chokepoint—hold secure." This context-specific information is stored by the DGEMS 200 and forwarded to the other team members' digital glass devices. In this manner, field members can be apprised of relevant information pertinent to their situation at any given time based on DGEMS 200 analysis, agency input, and/or teammate direction.

The context-specific information may be any digital information and/or media files, including text, image, audio, or video information, which is digitally stored, selectable, readable, displayable, modifiable, and/or capable of being created by an application operating on the digital glass device 110, agency computing device, or DGEMS 200. The DGEMS 200 may provide such context-specific information in a super-imposed fashion to the wearers' fields of vision in the form of icons, glyphs, or other distinct symbols as well as any other graphical representation ("Information Presence Glyphs"), and/or represented though audio alerts that may be heard by a user ("Information Presence Alerts"). In response to an Information Presence Glyph and/or Information Presence Alerts, a wearer may, through a device user interface, call, initiate and/or control an application, application page/view, web page, or other information display modality that provides additional information related to the Information Presence Glyph or Information Presence Alerts.

In an embodiment, creation of context-specific information may only be permitted upon authentication of the creating device/user. In addition, permissions to access, create, save, delete, and/or modify context-specific information by be provided to an administrator or other authorized personnel. In an embodiment, the context-specific information is encrypted for digital storage and/or transmission to/from the relevant devices.

In an embodiment, rules may be provided for automatically removing or deleting previously-stored context-specific information. Removing may involve transferring the stored information to a long-term storage site, whereas deleting may involve erasing the stored information from memory and/or causing the data blocks associated with the stored information to be identified as "available" for being overwritten.

The rules for deleting/removing may be based on any suitable criteria, including time and/or location proximity. In the case of a time-based rule, the information may be stored with a timestamp. After a predetermined amount of time has elapsed since the information was originally recorded, the information is deleted. In the case of a proximity-based rule, the information is stored with a location stamp corresponding to the approximate location of the event to which the information has relevance. When a current location of the wearers is determined to be a predetermined distance from the stored location stamp, the information is deleted. Many other rules, based on many other criteria, may be included independently or in cooperation with the time- and proximity-based rules herein described, In an embodiment, the context-specific information may be searchable. A user may search for particular stored information based on any number of input criteria, including key words, phrases, concepts, time parameters, file names, source device identifications, and/or incident or event names and identifiers. These search criteria can be applied to file names, contents of the information, information type, file type, etc. In addition, the search criteria manually provided may be supplemented with additional situational or context-specific criteria, such as the location from which the request was made, the time of the request, etc. For example, a search directive of "Find floor plans" provided from a wearer, will search for relevant floor plans to a particular location associated with the requesting digital glass device.

Digital Glass Enhanced Media System Connectivity Architectures

Several architectures exist for providing a DGEMS in an environment to provide audio and video services between one or more digital glass devices and one or more agencies. For example, the various architectures illustrated in FIGS. 5A-5F show various ways in which digital glass devices 510 can be connected with a DGEMS 570 and agencies 580.

Figure 5A:
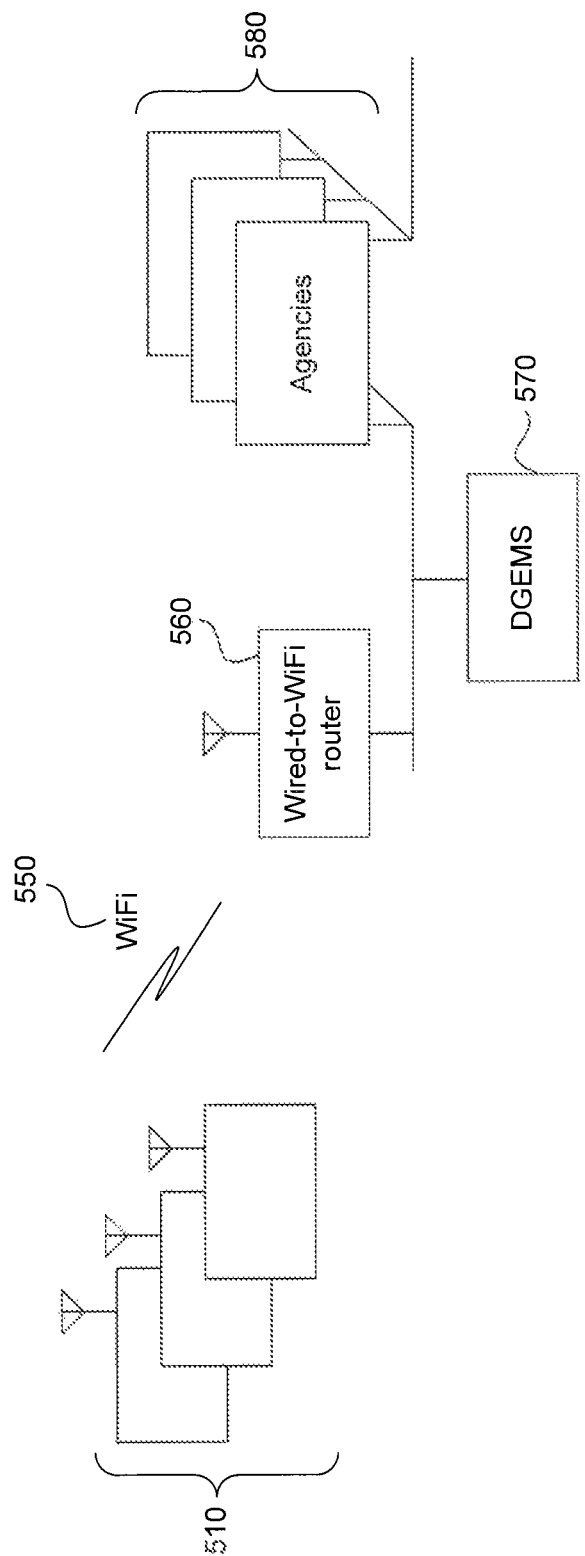
FIG. 5A illustrates an exemplary digital eyeglass and DGEMS communication configuration.

FIG. 5A illustrates an exemplary digital eyeglass and DGEMS communication configuration. In this configuration, the DGEMS 570, the agency 580 and a WiFi router 560 are connected to each other over a wired connection, such as Ethernet. The external agencies 580 and the DGEMS 570 can communicated directly with each other over the wired Ethernet connection, and the DGEMS is capable of communicated with the digital glass devices 510 over a WiFi connection via the router 560.

Figure 5B:
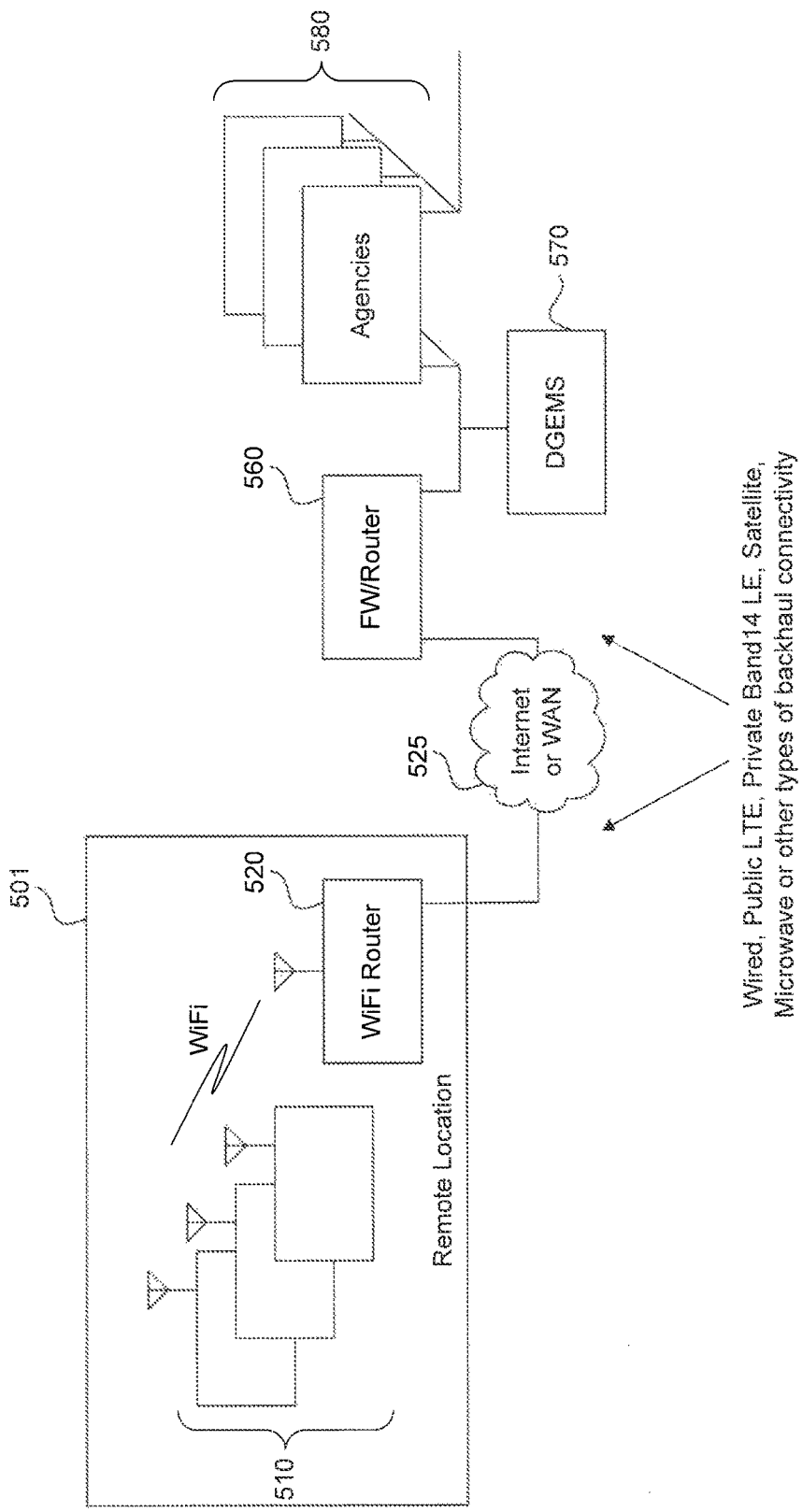
FIG. 5B illustrates an exemplary digital eyeglass and DGEMS communication configuration.

FIG. 5B illustrates an exemplary digital eyeglass and DGEMS communication configuration. In this exemplary configuration, the DGEMS 570, the external agencies 580 and the router 560 are connected to each other via a wired connection, such as Ethernet. At a remote location 501, a WiFi router 520 is provided to communicate with the digital glass devices 510. The WiFi router 520 communicates with the router 560 via the internet or a WAN 525. In this manner, the DGEMS 570 communicated with the digital glass devices 510 via the router 560, the WiFi router 520, and the inter let/WAN 525.

Figure 5C:
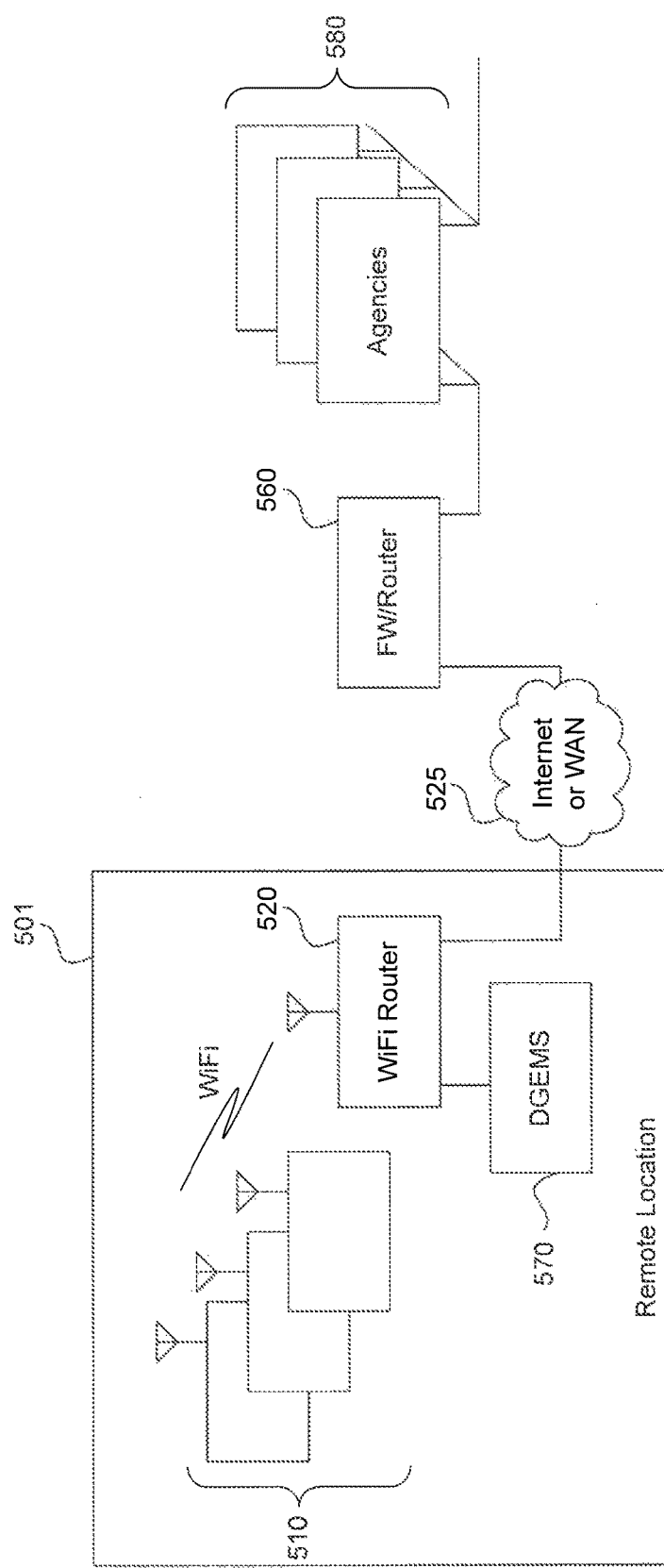
FIG. 5C illustrates an exemplary digital eyeglass and DGEMS communication configuration.

FIG. 5C illustrates an exemplary digital eyeglass and DGEMS communication configuration. In this exemplary configuration, the remote location 501 includes the WiFi router 520 and the DGEMS 570 connected to each other via a wired connection, as well as the digital glass devices 510 communicatively coupled to the WiFi router 520 over the WiFi. The WiFi router 520 is connected via the internet/WAN 525 to the router 560, which is directly connected to the external agencies 580 via a wired connection. In this configuration, the DGEMS 570 communicates with the digital glass devices 510 over a WiFi connection via the WiFi router 520, and communicates with the agency 580 over the internet/WAN 525 via the WiFi router 520 at the remote location as well as the router 560 on the agency side.

Figure 5D:
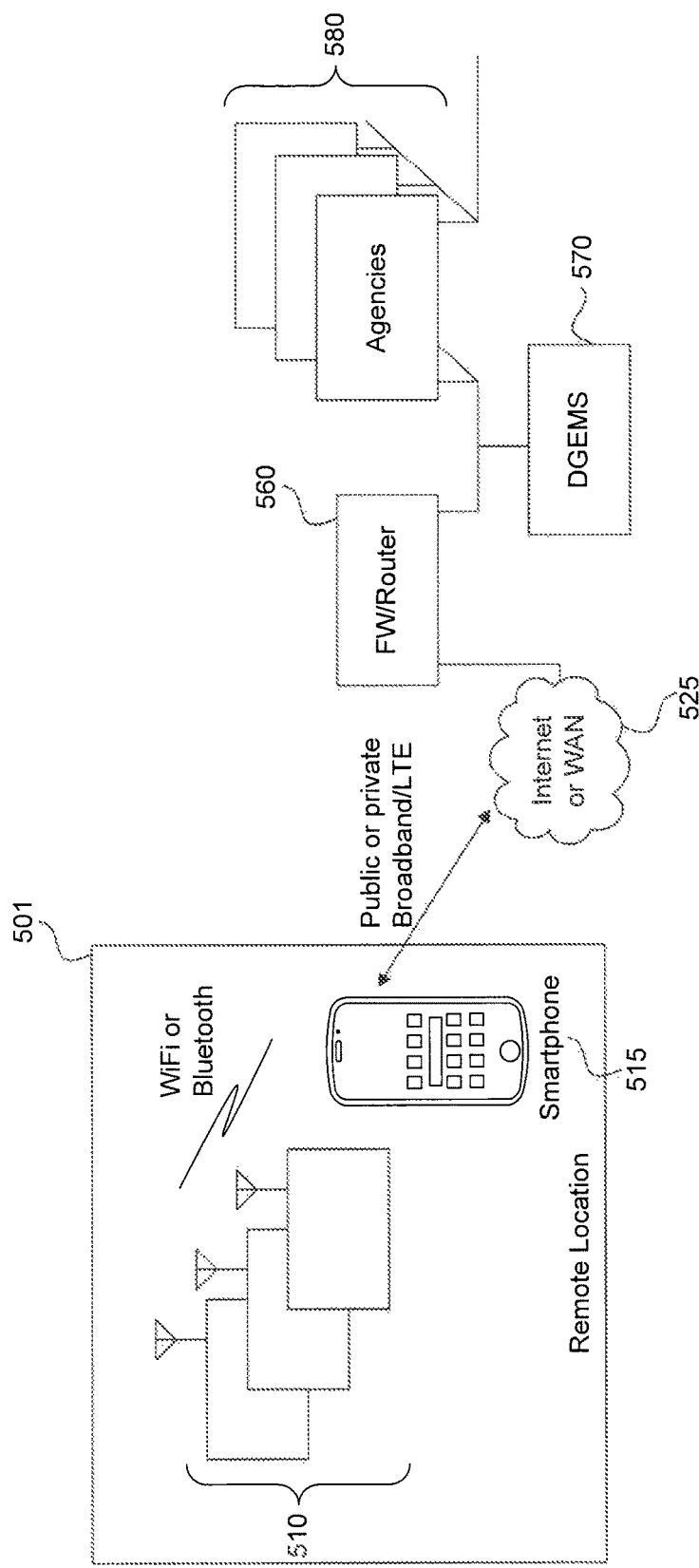
FIG. 5D illustrates an exemplary digital eyeglass and DGEMS communication configuration.

FIG. 5D illustrates an exemplary digital eyeglass and DGEMS communication configuration. In this exemplary configuration, the DGEMS 570, the external agencies 580, and the router 560 are connected to each other via a wired connection, such as Ethernet. At the remote location 501, a smartphone provides wireless connectivity between the digital glass devices 510 and the internet/WAN 525. As such, the DGEMS 570 communicates with the digital glass devices over the internet/WAN 525 via the router 560, and over a WiFi/Bluetooth connection provided by the smartphone 515 connected to the internet/WAN 525.

Figure 5E:
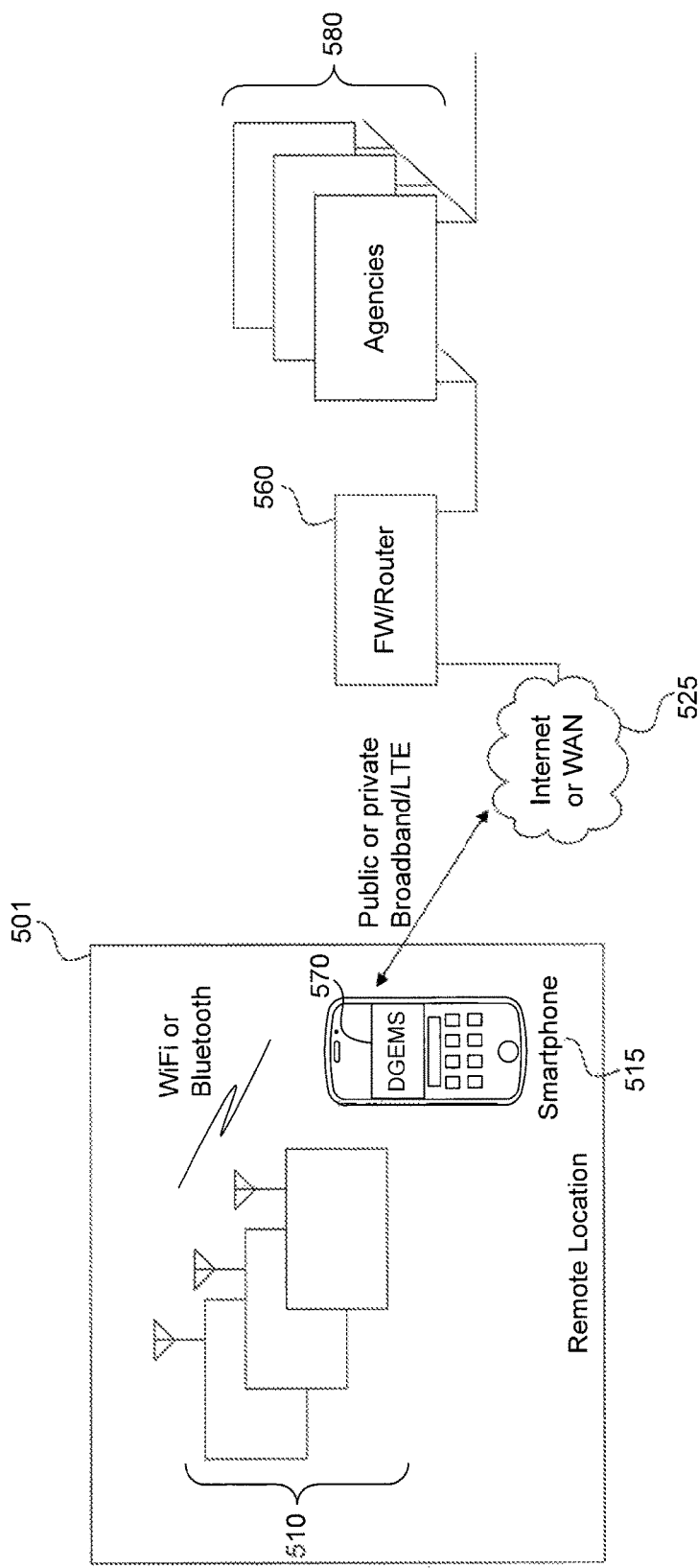
FIG. 5E illustrates an exemplary digital eyeglass and DGEMS communication configuration.

FIG. 5E illustrates an exemplary digital eyeglass and DGEMS communication configuration. In this exemplary configuration, the DGEMS 570 is included within the smartphone 515 device at the remote location. As such, the DGEMS 570 communicates with the digital glass devices 510 directly over a WiFi/Bluetooth connection established by the smartphone 515. In addition, the DGEMS 570 communicates with the external agencies 580 over the internet/WAN 525 (to which the smartphone 515 is connected) via the router 560.

Figure 5F:
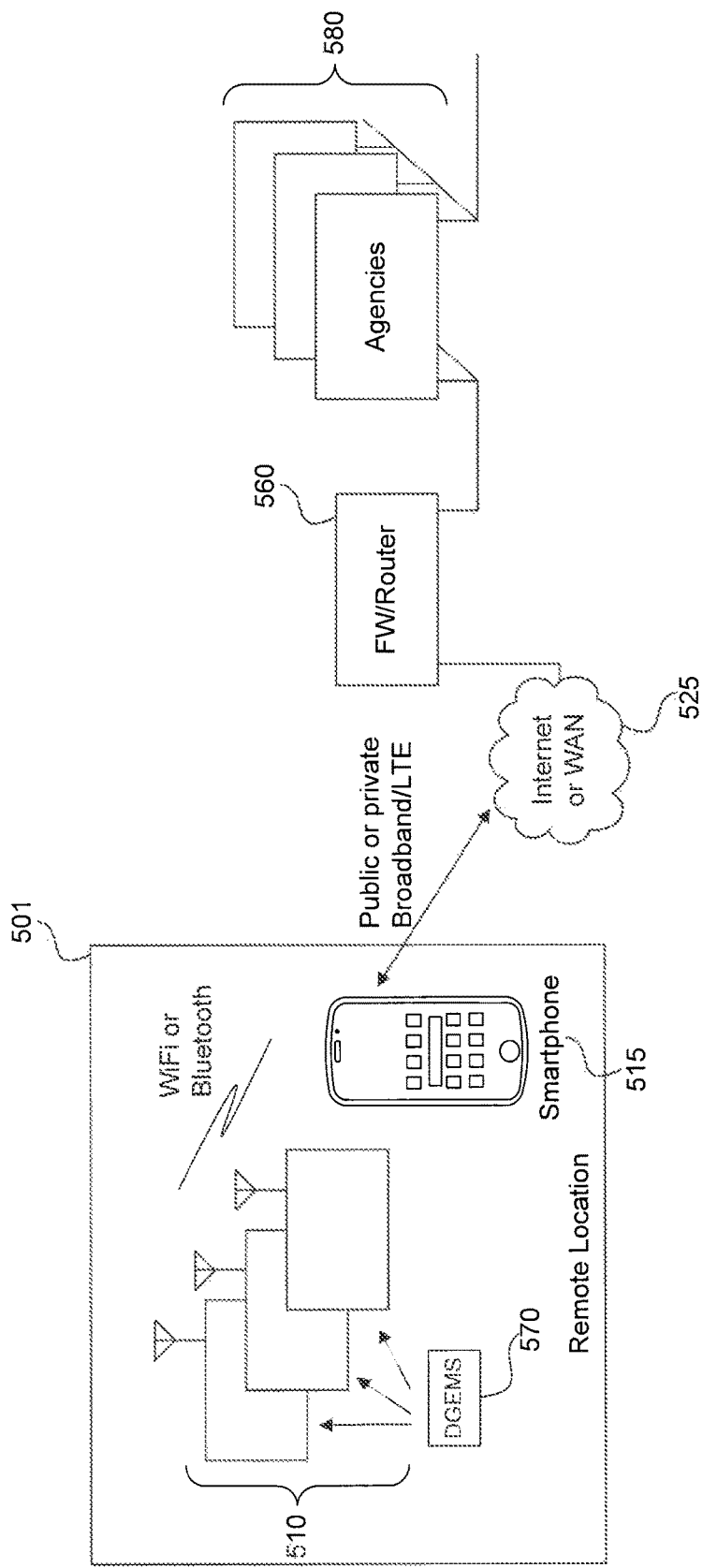
FIG. 5F illustrates an exemplary digital eyeglass and DGEMS communication configuration.

FIG. 5F illustrates an exemplary digital eyeglass and DGEMS communication configuration. In this configuration, the processing performed by the DGEMS 570 is provided in the digital glass devices 510. In various embodiments, the DGEMS 570 may be provided in one digital glass device 510, or may be divided among several digital glass devices. In the latter scenario, each digital glass device 510 includes a processor for carrying out at least a portion of the DGEMS 570 functionality, and preferably also cooperatively operates with the DGEMS 570 processors provided in the other digital glass devices 510. Therefore, the DGEMS 570 is capable of communicating with the digital glass devices 510 directly. The DGEMS 570 is also capable of communicating with the external agencies 580 over any suitable connection thereto. As depicted, this connection includes a WiFi/Bluetooth connection to a smartphone 515, which communicates with the agency 580 over the internet/WAN 525 via the router 560.

In embodiments, for each of the communication configurations described above with respect to FIGS. 5A-5F, the DGEMS 570 can be located either locally with a particular agency (e.g., DGEMS Agency 120), or centralized. In the localized configuration, the external agencies 580 define agencies authorized by the DGEMS agency for cooperation, whereas in the centralized configuration, the external agencies may include all agencies that may be involved with a particular incident. In addition, it should be understood that, for any of the above embodiments, WiFi can be replaced with any other suitable wireless communication method, including but not limited to 4G, 3G, 2G, and/or Bluetooth, among others, and that the Routers 560 and WiFi Routers 520 can be replaced with substantially similar equipment for supporting the alternative communication schemes.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

In addition, although the above description has been made with respect to digital glass devices, such as digitally-enhanced eyeglass technology, the same or substantially same configurations can be applied to any number of similar devices, such as smartwatches, smartphones, portable video cameras, goggles, helmets, etc. Preferably, these similar devices would at least include a display, an audio speaker, a microphone, and a camera, but these are not necessary to substantially carry out the spirit and scope of the present disclosure.

It will be apparent to those skilled in the relevant art(s) that various changes in form and detail can be made therein without departing from the spirit and scope of the disclosure. Further, the invention should not be limited by any of the above-described exemplary embodiments, but should be defined only in accordance with the following claims and their equivalents.

What is claimed is:

1. A digital glass-enhanced media system, the system comprising:
    a control module configured to determine a source of a received data stream, and to generate a control signal dictating routing of the data stream;
    a distribution module configured to route the received data stream to a corresponding destination based on the control signal;
    a digital glass transceiver configured to communicate with a plurality of digital glass devices; and
    an agency transceiver configured to communicate with a plurality of agencies,
    wherein the control module includes a registration module configured to store relationships between the plurality of digital glass devices and the plurality of agencies, and
    wherein the relationships define at least one Field Group of digital glass devices that are cooperatively operating in a common task, and at least one Agency Group of agencies that are cooperatively assisting with the common task.

2. The system of claim 1, wherein the control module is configured to generate the control signal based on the stored relationships.

3. The system of claim 2, wherein the relationships define which of the plurality of digital glass devices and which of the plurality of agencies are to receive data generated by a specific digital glass device or a specific agency.

4. The system of claim 2, wherein the registration module is configured to store an identification of a leader among the plurality of digital glass devices,
    wherein the control module includes a control input for receiving external control instructions from the leader.

5. The system of claim 4, wherein the control module is configured to modify the relationships stored in the registration module based on the control instructions received from the leader.

6. The system of claim 5, wherein the modifying of the relationships includes at least one of adding a first digital glass device to a first Field Group, removing the first digital glass device from the first Field Group, and reassigning the first digital glass device from the first Field Group to a second Field Group.

7. The system of claim 6, wherein the control module is configured to generate the control signal so as to cause the distribution module to route data streams received from the first digital glass device to all agencies associated with a first Agency Group that is identified as being in relationship with the first digital glass device, and to cause the distribution module to route data streams received from any of the agencies associated with the first Agency Group to the first digital glass device.

8. The system of claim 1, wherein the control module is configured to modify the relationships stored in the registration module based on control instructions received from a leader, and
    wherein the modifying of the relationships includes at least one of adding a first digital glass device to a first Field Group, removing the first digital glass device from the first Field Group, and reassigning the first digital glass device from the first Field Group to a second Field Group.

9. A digital glass-enhanced media system for facilitating communications between a digital glass device and an agency, comprising:
    a transceiver configured to receive a data stream;
    a control module that includes a registration module configured to store a relationship between the digital glass device and the agency, the control module being configured to determine whether the received data stream originates from the digital glass device or the agency, and to generate a control signal dictating how the received data stream is to be routed based on the stored relationship; and
    a distribution module configured to route information from the digital glass device to the agency, or to route information from the agency to the digital glass device based on the control signal generated by the control module,
    wherein the relationship defines at least one Field Group, the at least one Field Group defining a group of digital glass devices that includes the digital glass device as carrying out a task, and at least one Agency Group the at least one Agency Group defining a group of agencies that includes the agency as cooperatively assisting with the task.

10. The system of claim 9, wherein the digital glass device is a digitally-enhanced wearable eyeglass device having at least data inputs of a camera and a microphone, and at least data outputs of a display and a speaker.

11. The system of claim 9, wherein the distribution module includes a processing module configured to perform processing of the received data stream,
    wherein the processing includes at least one of filtering, combining, down-converting, up-converting, visual balancing, sound balancing, equalizing, normalizing, and synchronizing.

12. The system of claim 11, wherein the received data stream includes a first data stream and a second data stream.

13. The system of claim 12, wherein the processing module is configured to combine the first data stream and the second data stream into a single data stream.

14. The system of claim 12, wherein the processing module is configured to output the first data stream and the second data stream sequentially.

15. A digital glass-enhanced media system in communication with a plurality of digital glass devices and a plurality of agencies, the system comprising:
    a transceiver configured to receive data streams;
    a control module configured to control routing of the received data streams, the control module including:
        a registration module configured to register the plurality of digital glass devices and to store relationships between the plurality of digital glass devices and the plurality of agencies, the relationships defining at least one Field Group of digital glass devices that are cooperatively operating in a common task and at least one Agency Group of agencies that are cooperatively assisting with the common task; and
a source/destination determination module configured to determine a source of a received data stream; and a destination of the received data stream; based on the stored relationships; and
a distribution module configured to route the received data streams according to the routing control performed by the control module.

16. The system of claim 15, wherein the distribution nodule includes a processing module configured to process the received data streams, and a switching module configured to direct data streams to their respective destinations according to the routing control.

17. The system of claim 16, wherein the registration module registers a first digital glass device upon a user inputting a unique II) associated with the first digital glass device, and
wherein the registering of the first digital glass device includes storing the unique ID in association with a Field Group from among the at least one field Group of other digital glass devices, an Agency Group from among the at least one Agency Group of assisting agencies, and a leader tag indicating whether the first digital glass device is a group leader.

18. The system of claim 16, wherein the source/destination determination module identifies a plurality of data streams that are all to be routed to a same destination digital glass device, and
wherein the control module controls the processing module to combine the plurality of data streams.

19. The system of claim 18, wherein the combining includes overlaying the data included within the plurality of data streams.

20. The system of claim 15, wherein the control module is configured to cause the distribution module to transmit stored context-specific information to at least one digital glass device,
wherein the context specific-information is digitally-stored information relevant to a particular location or event associated with the at least one digital glass device.

21. The system of claim 20, wherein the control module is configured to receive sensor readings from a first digital glass device from among the plurality of digital glass devices, to detect the occurrence of an event by analyzing the received sensor readings, and to cause the distribution module to transmit stored context-specific information based on the detected event.

22. A digital glass-enhanced media system, the system comprising:
a control module configured to determine a source of a received data stream, and to generate a control signal dictating routing of the data stream;
a distribution module configured to route the received data stream to a corresponding destination based on the control signal;
a digital glass transceiver configured to communicate with a plurality of digital glass devices; and
an agency transceiver configured to communicate with a plurality of agencies,
wherein the control module includes a registration module configured to store relationships between the plurality of digital glass devices and the plurality of agencies, and
wherein the control module is configured to generate the control signal based on the stored relationships,
wherein the relationships define which of the plurality of digital glass devices and which of the plurality of agencies are to receive data generated by a specific digital glass device or a specific agency,
wherein the registration module is configured to store an identification of a leader among the plurality of digital glass devices,
wherein the control module includes a control input for receiving external control instructions from the leader,
wherein the control module is configured to modify the relationships stored in the registration module based on the control instructions received from the leader,
wherein the relationships define at least one Field Group of digital glass devices that are cooperatively operating in a common task, and at least one Agency Group of agencies that are cooperatively assisting with the common task, and
wherein the modifying of the relationships includes at least one of adding a first digital glass device to a first Field Group, removing the first digital glass device from the first Field Group, and reassigning the first digital glass device from the first Field Group to a second Field Group.

23. A digital glass-enhanced media system in communication with a plurality of digital glass devices and a plurality of agencies, the system comprising:
a transceiver configured to receive data streams;
a control module configured to control routing of the received data streams, the control module including:
a registration module configured to register the plurality of digital glass devices; and
a source/destination determination module configured to determine a source of a received data stream, and a destination of the received data stream; and
a distribution module configured to route the received data streams according to the routing control performed by the control module, the distribution module including:
a processing module configured to process the received data streams; and
a switching module configured to direct the received data streams to their respective destinations according to the routing control,
wherein the registration module registers a first digital glass device upon a user inputting a unique ID associated with the first digital glass device, the registering of the first digital glass device including storing the unique ID in association with a Field Group of other digital glass devices, an Agency Group of assisting agencies, and a leader tag indicating whether the first digital glass device is a group leader.

* * * * *

UNITED STATES PATENT AND TRADEMARK OFFICE
CERTIFICATE OF CORRECTION

PATENT NO. : 9,581,816 B2
APPLICATION NO. : 14/072379
DATED : February 28, 2017
INVENTOR(S) : Wengrovitz et al.

Page 1 of 1

It is certified that error appears in the above-identified patent and that said Letters Patent is hereby corrected as shown below:

In the Claims

In Column 16, Line 34, replace "Agency Group the" with --Agency Group, the--.

In Column 17, Line 5, replace "a received data stream;" with --a received data stream,--.

In Column 17, Line 6, replace "the received data stream;" with --the received data stream,--.

In Column 17, Line 18, replace "II)" with --ID--.

In Column 17, Line 22, replace "field Group" with --Field Group--.

Signed and Sealed this
Twenty-fourth Day of July, 2018

Andrei Iancu
*Director of the United States Patent and Trademark Office*